US009330665B2

(12) United States Patent
Morales et al.

(10) Patent No.: US 9,330,665 B2
(45) Date of Patent: May 3, 2016

(54) AUTOMATIC UPDATING OF CONFIDENCE SCORING FUNCTIONALITY FOR SPEECH RECOGNITION SYSTEMS WITH RESPECT TO A RECEIVER OPERATING CHARACTERISTIC CURVE

(75) Inventors: Nicolas Morales, Aachen (DE); Dermot Connolly, Aachen (DE); Andrew Halberstadt, Burlington, MA (US)

(73) Assignee: Nuance Communications, Inc., Burlington, MA (US)

( * ) Notice: Subject to any disclaimer, the term of this patent is extended or adjusted under 35 U.S.C. 154(b) by 377 days.

(21) Appl. No.: 13/977,174

(22) PCT Filed: Jan. 7, 2011

(86) PCT No.: PCT/US2011/020495
§ 371 (c)(1),
(2), (4) Date: Jun. 28, 2013

(87) PCT Pub. No.: WO2012/094014
PCT Pub. Date: Jul. 12, 2012

(65) Prior Publication Data
US 2013/0275135 A1     Oct. 17, 2013

(51) Int. Cl.
*G10L 15/01* (2013.01)
*G10L 15/065* (2013.01)
*G10L 15/22* (2006.01)
*G10L 15/06* (2013.01)

(52) U.S. Cl.
CPC ............ *G10L 15/22* (2013.01); *G10L 15/01* (2013.01); *G10L 15/065* (2013.01); *G10L 2015/0635* (2013.01); *G10L 2015/0636* (2013.01)

(58) Field of Classification Search
CPC .............. G10L 15/01; G10L 15/063; G10L 2015/0635; G10L 2015/0636; G10L 15/065
USPC .................................................. 704/236, 244
See application file for complete search history.

(56) References Cited

U.S. PATENT DOCUMENTS

| 5,860,063 | A  | * | 1/1999  | Gorin et al. ................. 704/257 |
| 7,149,687 | B1 | * | 12/2006 | Gorin et al. ................. 704/243 |
| 7,657,433 | B1 | * | 2/2010  | Chang ........................ 704/252 |
| 8,050,929 | B2 | * | 11/2011 | Hu et al. .................... 704/270.1 |
| 8,239,203 | B2 | * | 8/2012  | Stubley ................. G10L 15/08 704/235 |
| 2007/0078653 | A1 | * | 4/2007 | Olsen ......................... 704/240 |

(Continued)

OTHER PUBLICATIONS

Keshet, Joseph, et al. "Discriminative keyword spotting." Speech Communication 51.4, Apr. 2009, pp. 317-329.*

(Continued)

*Primary Examiner* — James Wozniak
(74) *Attorney, Agent, or Firm* — Banner & Witcoff, Ltd.

(57) ABSTRACT

Automatically adjusting confidence scoring functionality is described for a speech recognition engine. Operation of the speech recognition system is revised so as to change an associated receiver operating characteristic (ROC) curve describing performance of the speech recognition system with respect to rates of false acceptance (FA) versus correct acceptance (CA). Then a confidence scoring functionality related to recognition reliability for a given input utterance is automatically adjusted such that where the ROC curve is better for a given operating point after revising the operation of the speech recognition system, the adjusting reflects a double gain constraint to maintain FA and CA rates at least as good as before revising operation of the speech recognition system.

30 Claims, 6 Drawing Sheets

(56) References Cited

U.S. PATENT DOCUMENTS

2008/0281596 A1* 11/2008 Kim et al. ............... 704/251
2009/0055176 A1*  2/2009 Hu et al. ................. 704/240
2009/0259466 A1* 10/2009 Stubley et al. .......... 704/240
2010/0023331 A1*  1/2010 Duta et al. ............... 704/257

OTHER PUBLICATIONS

Khreich, Wael, et al. "Iterative Boolean combination of classifiers in the ROC space: An application to anomaly detection with HMMs." Pattern Recognition43.8, Aug. 2010, pp. 2732-2752.*

Koumpis, Konstantinos, and Steve Renals. "Evaluation of extractive voicemail summarization." in Proc. ISCA Workshop on Multilingual Spoken Document Retrieval, 2003, pp. 19-24.*

Sankar, Ananth, et al. "Automatic confidence score mapping for adapted speech recognition systems." Acoustics, Speech, and Signal Processing (ICASSP), 2002 IEEE International Conference on. vol. 1. IEEE, May 2002, pp. 213-216.*

Sankar, Ananth, et al. "A comprehensive study of task-specific adaptation of speech recognition models." Speech communication 42.1, Jan. 2004, pp. 125-139.*

Williams, David Arthur Gethin. Knowing what you don't know: roles for confidence measures in automatic speech recognition. University of Sheffield, May 1999, pp. 1-111.*

Batista, et al. "Improving performance of HMM-based off-line signature verification systems through a multi-hypothesis approach." International Journal on Document Analysis and Recognition (IJDAR) 13.1, Mar. 2010, pp. 33-47.*

* cited by examiner

| | CA1 | CA2 | REL2 | Ta@FA2 | Ts:REL2 | FA1 | FA2 | REL2 | Ta@FA1 | Ts:REL2 |
|---|---|---|---|---|---|---|---|---|---|---|
| no mapping | 83.67 | 92.91 | | 10.7 | 256.73 | 7.07 | 12.15 | 71.92 | 0.02 | |
| probability mapping | 83.67 | 89.26 | | 2.84 | | 7.07 | 5.26 | 24.17 | 1.59 | |
| del blind w/ truth | 83.67 | 89.16 | | 2.3 | | 7.07 | 4.1 | 41.98 | 2.27 | 13.36 |

*Fig. 6*

AUTOMATIC UPDATING OF CONFIDENCE SCORING FUNCTIONALITY FOR SPEECH RECOGNITION SYSTEMS WITH RESPECT TO A RECEIVER OPERATING CHARACTERISTIC CURVE

FIELD OF THE INVENTION

The present invention relates to automatic speech recognition, and more specifically to confidence scoring functionality in speech recognition systems.

BACKGROUND ART

Speech recognition systems try to determine the semantic meaning of a speech input. One common example is an automated dialog system in which the system prompts a user to provide a speech input indicating what action to take next. A speech recognition component analyzes the resulting speech input to try to determine its semantic meaning. Typically, statistical speech models are used to determine a sequence of words that best corresponds to the speech input.

Figure 1:
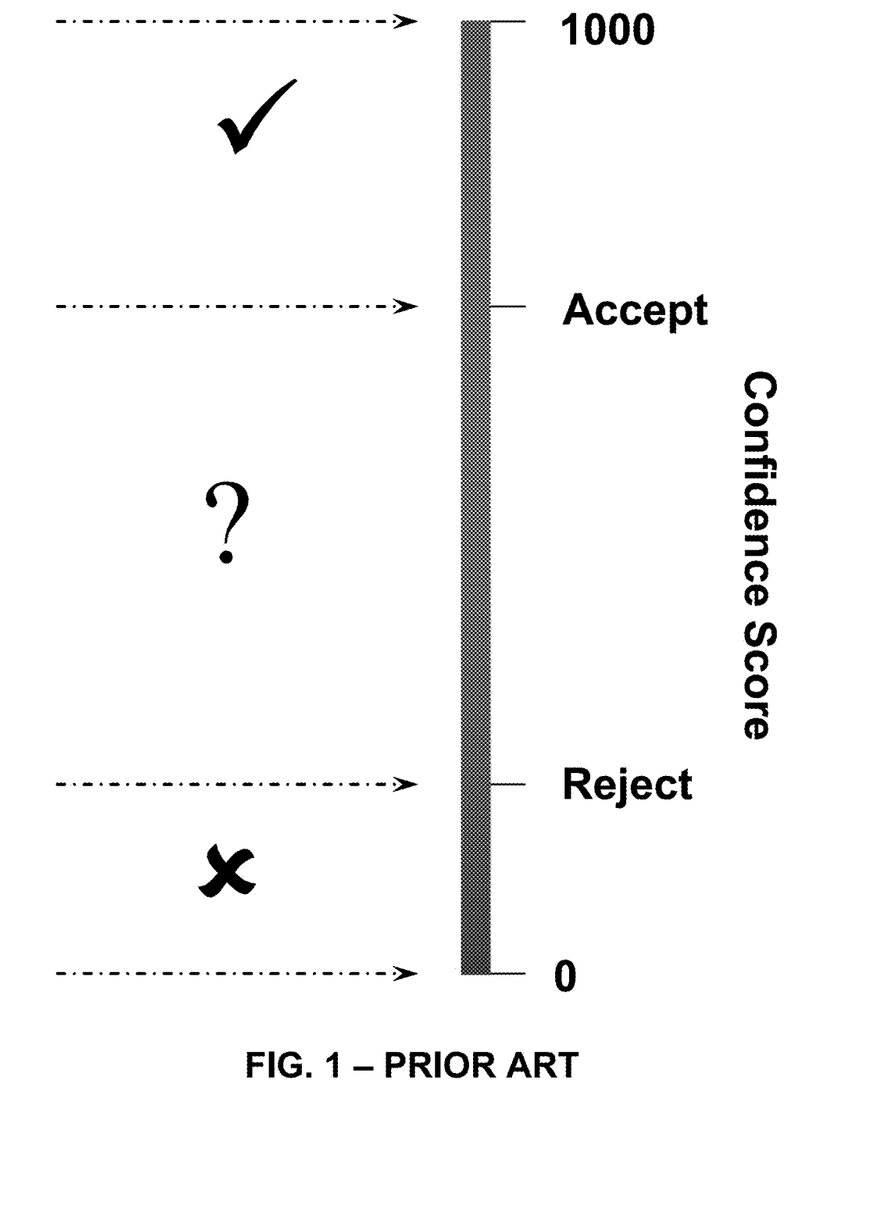
FIG. 1 shows a typical confidence score scale arrangement for use in a speech recognition engine.

Confidence scores can be used to estimate the reliability of the output word sequence for the speech input. FIG. 1 shows a scale of confidence scores along a vertical axis ranging from a high of 1000 to a low of 0. Typically, speech recognition outputs having a confidence score above a given accept threshold are automatically accepted as probably correctly recognized. And speech recognition outputs having a confidence score below a given reject threshold are automatically rejected as probably not correctly recognized. Speech recognition outputs between the two confidence score thresholds may or may not be correctly recognized and usually require some form of user confirmation.

Various system performance measurements are used to set the confidence score thresholds. Inputs above the acceptance threshold that are automatically accepted contribute to a Correct Accepted (CA) rate when the identification is correct, and to a False Accepted (FA) rate when incorrect. Similarly, inputs below the rejection threshold that are automatically rejected contribute to a Correct Rejected (CR) rate when the rejection is correct (e.g., the speech input is out of the recognition vocabulary), and to a False Rejected (FR) rate when the rejection is incorrect (e.g., the speech input is within the recognition vocabulary, but the utterance was rejected). Inputs between the thresholds that require user confirmation contribute to Correct Confirmed (CC) and False Confirmed (FC) rates.

Ideally, the CA and CR rates should be as high as possible, while the FA and FR rates should be as low as possible, and at the same time, user confirmation, CC and FC should be required as seldom as possible. In practice, this requires compromise and balancing of competing factors. Typically, various operating point criteria are established such as some x % FA, y % FC, z % CA, etc. Then system performance data is collected for one or more test sets. This requires that some recognition correctness criteria be established. Recognition of the test set is then performed with the final recognition grammar package and each recognition result is labeled as correct or incorrect. From these results, a Receiver Operating Characteristic (ROC) curve can be determined (FA versus CA). The defined system operating points are located on the ROC curve which are used to then set the corresponding confidence score thresholds.

Figure 2:
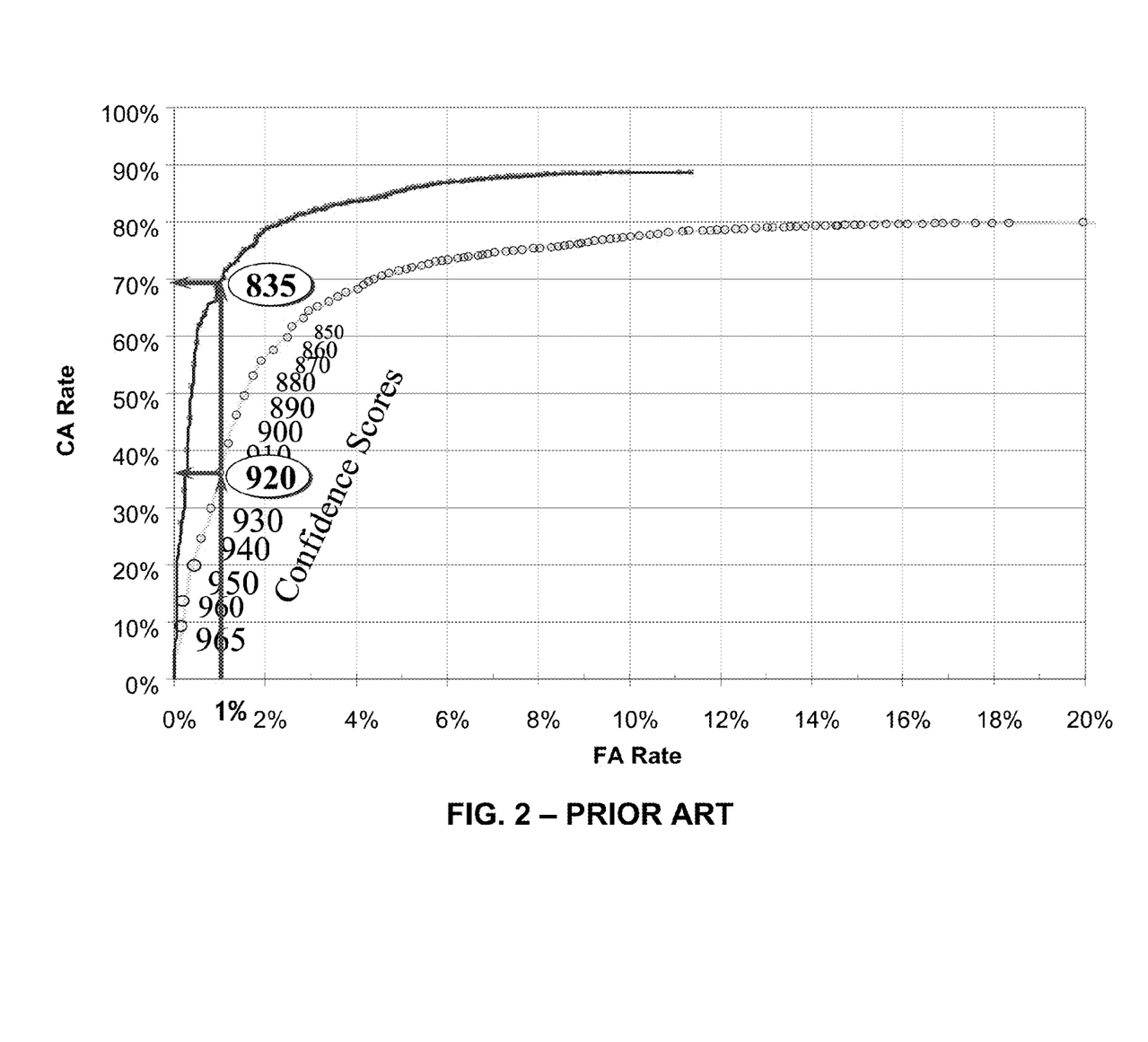
FIG. 2 shows an example of setting and using a Receiver Operating Characteristic (ROC) curve to adjust confidence scoring.

FIG. 2 shows one specific example of setting and using a Receiver Operating Characteristic (ROC) curve to set confidence score thresholds. The horizontal axis is FA rate and the vertical axis is CA rate. In the example shown, the dark curve plots confidence scores for an in-vocabulary test set and the light curve plots confidence scores for a more realistic test with some out-of-vocabulary (OOV) data. Setting an accept threshold to meet a 1% FA operating point would correlate to a confidence score of 835 (out of 1000) and a 69% CA rate in the in-vocabulary data set, but in the more realistic right hand data set with some OOVs, would require a confidence score of 920 and achieve just a 36% CA rate.

SUMMARY OF THE INVENTION

Embodiments of the present invention are directed to systems and methods for automatically adjusting confidence scoring functionality for a speech recognition engine that is implemented in multiple computer processes functioning in a computer processor. Operation of the speech recognition system is revised so as to change an associated receiver operating characteristic (ROC) curve describing performance of the speech recognition system with respect to rates of false acceptance (FA) versus correct acceptance (CA). Then, a confidence scoring functionality related to recognition reliability for a given input utterance is automatically adjusted such that where the ROC curve is better for a given operating point after revising the operation of the speech recognition system, the adjusting reflects a double gain constraint to maintain FA and CA rates at least as good as before revising operation of the speech recognition system.

Where the ROC curve is not better for a given operating point after revising the operation of the speech recognition system, the adjusting can at least minimize worsening of the FA and CA rates. Automatically adjusting the confidence scoring functionality may include establishing a mapping to maintain equivalence of the confidence scoring functionality before and after revising the operation of the speech recognition system. In addition or instead, the confidence scoring functionality may also include automatically updating the confidence score thresholds.

Automatically adjusting the confidence scoring functionality may be further based on a developer user input establishing a priority favoring FA or CA rate. Or automatically adjusting the confidence scoring functionality may be based on some other criteria such as accepting and rejecting an equal percentage of input utterances as before revising the operation of the speech recognition system. Automatically adjusting the confidence scoring functionality may further be based on a mapping to posterior probabilities. And automatically adjusting the confidence scoring functionality may further be based on using actual application data with or without transcriptions.

Embodiments of the present invention also include a computer program product implemented in a computer readable storage medium for automatically adjusting confidence score thresholds of a speech recognition engine according to any of the above.

DETAILED DESCRIPTION OF SPECIFIC EMBODIMENTS

Speech recognition applications are often updated in order to improve system performance. This process aims to provide both higher recognition accuracy and better confidence scoring functionality. But the changes typically result in a new confidence score distribution in the revised system which may very different from that in the old system. So whenever an existing system is revised or updated, the confidence scoring functionality needs to be re-tuned. Otherwise, the undesirable situation can arise where the user-perceived accuracy (e.g., correct acceptance and correct confirmation) seems worse than before.

For example, confidence score thresholds are ideally set using the ROC curve to balance the rates of FA vs. CA. Setting a confidence score threshold to a low confidence value has the positive effect that CA is high, and the negative effect that FA is also high. The contrary happens if the confidence score threshold is set to a high value. A compromise is needed when re-tuning the confidence score thresholds depending on the particular goal of the application. For example, online-banking applications need very low FA in password questions. This task is non-trivial and in existing systems requires human intervention. A given system application often uses several hundred different confidence score thresholds depending on the group of grammars used. Where considerable time has previously been spent tuning the confidence score thresholds, re-tuning every time a system is updated is a severe inconvenience.

Embodiments of the present invention are directed to systems and methods for automatic updating of confidence scoring functionality for deployments of revised speech recognition systems. Because the confidence updating is automatic, no human intervention is required. In addition, embodiments are generally immune to changes in scale and/or shifts in confidence scores for the updated system. The customer sees the improved performance of the new revised system without having to manually retune confidence score thresholds.

Figure 3:
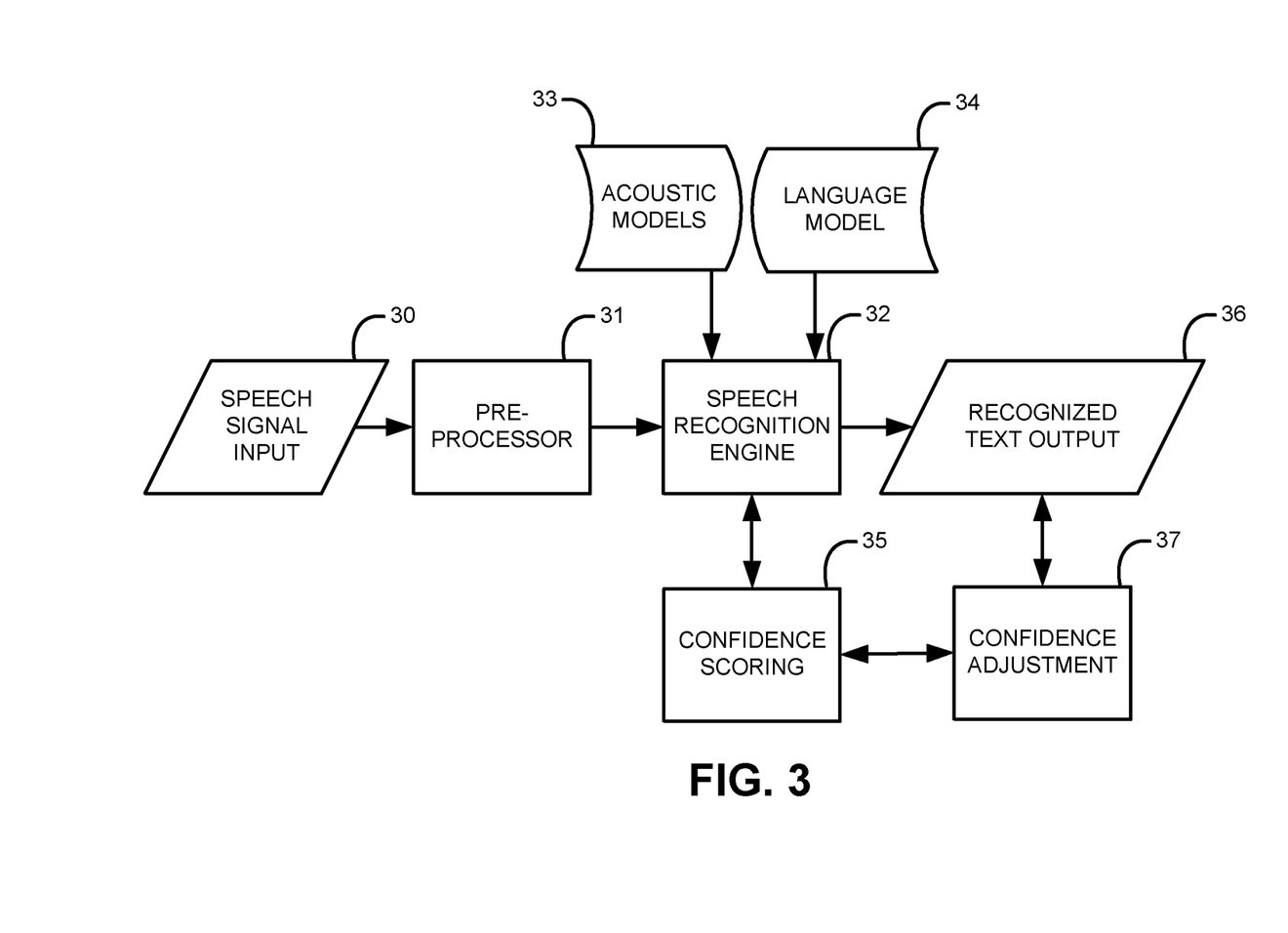
FIG. 3 shows various functional blocks in a speech recognition engine according to an embodiment of the present invention.
Figure 4:
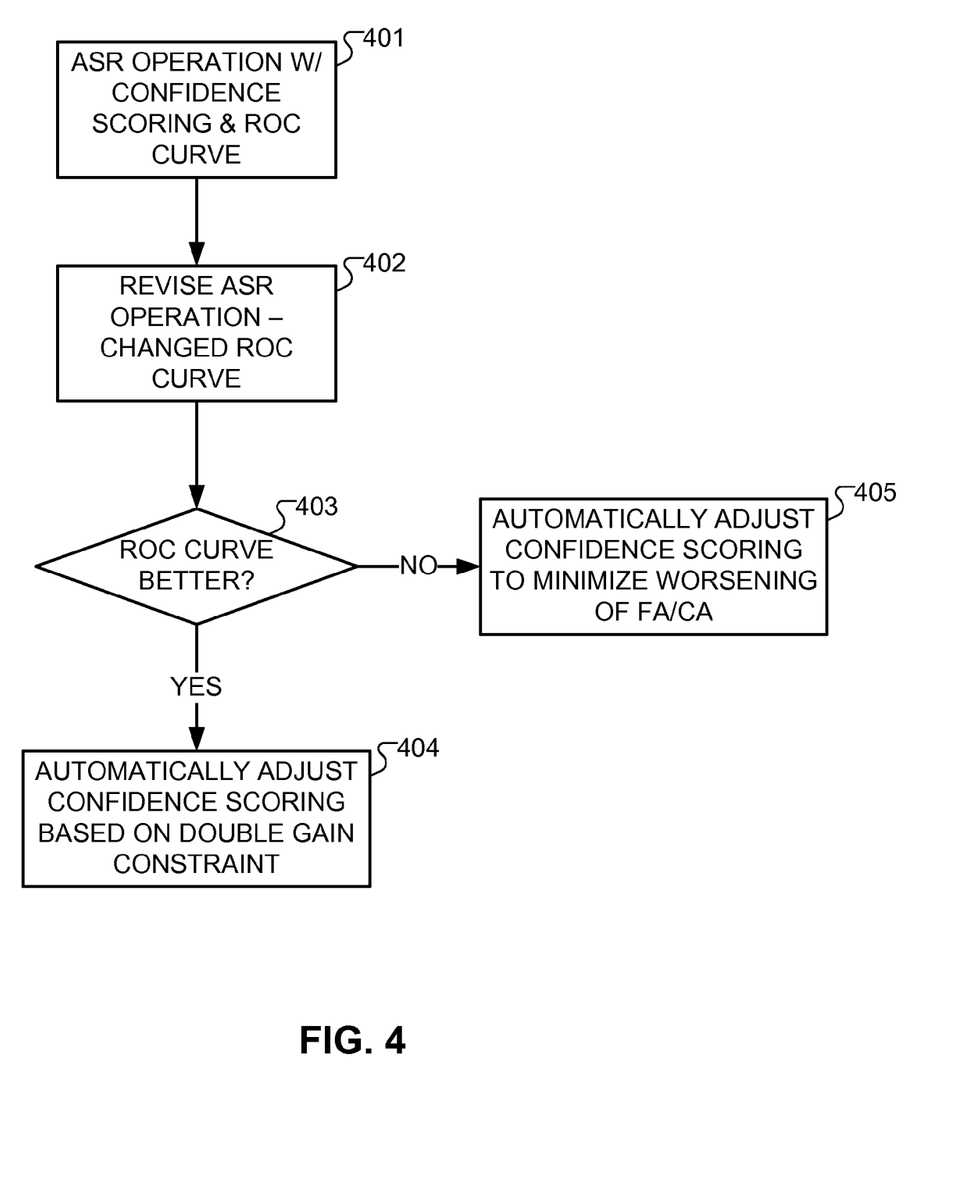
FIG. 4 shows various steps in automatic adjustment of confidence scoring according to an embodiment of the present invention.

FIG. 3 shows various functional blocks in a speech recognition system which benefits from an embodiment of the present invention. FIG. 4 shows various logical steps according to one specific embodiment. Initially, normal operation of the system performs automatic speech recognition (ASR) that determines representative text corresponding to input speech, step 401. More specifically, an initial computer process on at least one hardware implemented processor speech signal input module 30 receives a speech input from a user and converts it into a representative electrical signal. For example, this may be based on the use of a conventional microphone. Pre-processor 31 is a computer process on at least one hardware implemented processor that initially converts the speech input signal into a sequence of digital speech frames. Each speech frame can be thought of as a multi-dimensional vector that represents various characteristics of the speech input signal present during a short time window. The speech recognition engine 32 is a set of computer processes on at least one hardware implemented processor that compare the sequence of speech frames to various acoustic models 33 and a language model 34 to determine a representative recognized text output 36 that corresponds to the speech input. As explained above in the background section, this also involves comparing the recognition results to a confidence scoring functionality 35 that controls whether the recognition results are accepted, confirmed, or rejected. As discussed above, this operation of the system is characterized by an associated receiver operating characteristic (ROC) curve that describes the performance of the system with respect to rates of false acceptance (FA) versus correct acceptance (CA).

At some point, operation of the old speech recognition system is revised so as to change the ROC curve, step 402. For example, a new revision of a speech recognition system may use a new algorithm for sentence confidence scores which performs better than the previous old system. Other system functionality may also be changed by the revision, for example, updated or improved acoustic models. If the ROC curve is better for a given operating point after revising the operation of the speech recognition system, step 403, then a confidence scoring functionality related to recognition reliability for a given input utterance is automatically adjusted such that the adjusting reflects a double gain constraint to maintain FA and CA rates at least as good as before revising operation of the speech recognition system, step 404. Otherwise, if the ROC curve is not better for a given operating point after revising the operation of the speech recognition system, step 403, then a confidence scoring functionality related to recognition reliability for a given input utterance is automatically adjusted to at least minimize the worsening of the FA and CA rates. For example, a pseudo code representation of such a process might be set forth as follows:

```
Process ConfidenceUpdate
    for ROC_better = True
        adjust confidence scoring until double_gain = True
    else
        adjust confidence scoring until FA_change, CA_change = min
```

There are basically two specific approaches. One way is to update confidence score thresholds as tuned for the old system to fit the new confidence distributions so that they are usable in the new revised system. Or rather than updating the confidence score thresholds, the confidence scores themselves can be automatically mapped from the old system to the new system to modify the new confidence score distribution to fit the old confidence score thresholds.

Following the first approach the old confidence score thresholds are updated to fit the recognition accuracy and confidence score distribution of the new system. Although a typical strategy is to set two confidence thresholds in order to create the three regions of accept, confirm, and reject, there are other possibilities, such as setting only one threshold or setting more than two thresholds. The discussion below treats each threshold independently and so is valid for any number of confidence thresholds in a system. The mapping of the confidence score thresholds follows a double gain constraint which requires that both FA and CA for the new system have to be at least as good for each threshold as those obtained with the old system and the old threshold. This assumes that the ROC of the new system is above that of the old system (better) for the threshold considered. This threshold update is different from the standard approach of simply setting new thresholds from scratch for the new system, which requires setting new target performance for FA and CA. Instead, updating of the confidence thresholds can target FA and CA values that are derived from the original system.

When a significant amount of real application data with transcriptions (labels) is available, it is possible to obtain ROC curves for both the original and the new systems. The original confidence score thresholds effectively define the FA and CA values of the original system. These values can then be used to set a range of points in the ROC of the new system that satisfy the double gain constraint, and an actual operating point can be chosen from the range of points that satisfy this constraint, also possibly taking into account whether FA or CA is prioritized.

Figure 5:
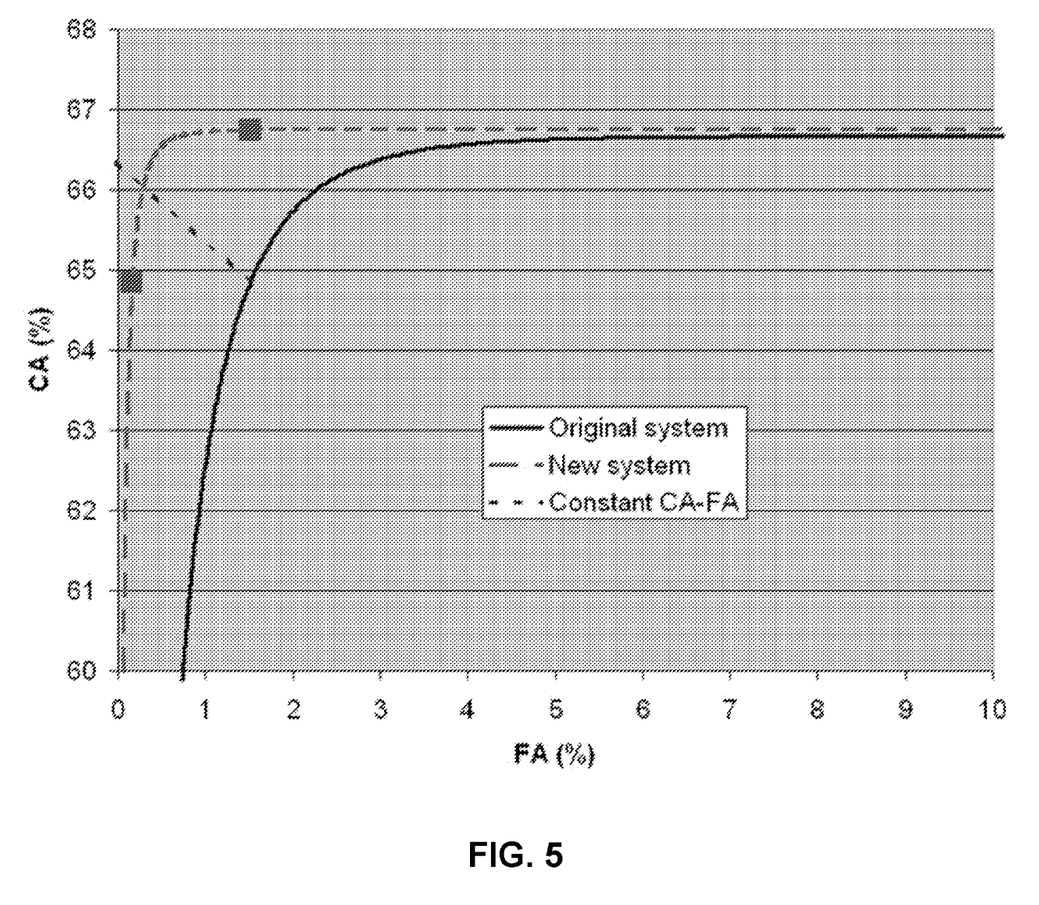
FIG. 5 shows ROC curves for 2 systems and a straight line representing points of constant percentage of utterances accepted by a system.

Even when no real application data with transcriptions is available, it is still possible to find new system confidence score thresholds that satisfy the double gain constraint. The confidence score thresholds for the new system can be set to accept and reject the same number of utterances as in the original system with the original confidence score thresholds. In FIG. 5, two ROC curves are shown, the lower one representing the original system and the upper one representing the new system. The straight line shows points in the space that have constant values of score=CA−FA. Assuming that the point where the straight line cuts the old system ROC curve is the original operating point, then having both CA and FA normalized by the total number of utterances, all points on the straight line represent a constant number of accepted/rejected utterances, which is the criterion followed for the update. Following this criterion produces the new operating point where the straight line cuts the new system ROC curve. In the case of a system update without transcriptions, the actual shapes of the ROC curves are unknown, but from FIG. 5 it is apparent that as long as the ROC curve of the new system is above that of the old system for the given confidence score threshold point, then both FA and CA will satisfy the double gain constraint. In addition, even where the ROC curve is not better for a given operating point after revising the operation of the speech recognition system, the loss in FA and CA will be balanced so that the adjusting can at least minimize worsening of the FA and CA rates.

In a variation of the foregoing, the confidence score threshold can be modified to prioritize for either better FA or better CA. To find out how much larger or smaller percentage of utterances need to be accepted with respect to the updated confidence threshold initially obtained as per the above, the shape of the ROC curves can be indirectly estimated (for example, from development data with transcriptions). In such a case, the user should consider the risks, evaluate performance, and if necessary back-off to the above safe strategy for updating the confidence threshold.

One way to influence an FA/CA priority setting of the new operating point is with a confidence update interface with an adjustable slider. More specifically, when the ROC curve of the new system is better than the ROC curve of the old system, there will be a range of confidence score threshold values that satisfy the double gain constraint. A confidence update user interface including an adjustable slider control can present a linear scale, with "lower FA" (e.g., "lower percentage of false acceptance") on the left and "higher CA" (e.g., "higher percentage of correct acceptance") on the right, with the initial default setting being in the middle of the range.

This type of confidence update interface provides some useful advantages. First, it clearly illustrates to the end customer the trade-off between the two desirable outcomes of low FA and high CA. In current practice, this idea is not always well understood by end users. In addition, a confidence update slider control makes it unnecessary for the end user to pick any absolute number for FA or CA, such as "<2% FA" or some such. This more realistically reflects real life practice where absolute FA and CA rates vary widely based on the application and dialogue state. Thus, a threshold update slider allows the system to automatically determine a good operating point, based on the relative importance of FA and CA as specified by the user.

For example, in the case where there is real application data with transcriptions available, the threshold update slider can control the relative weight w of CA and FA based on a score formula such as $w*CA-(1-w)*FA$, with $0<w<1$. It is then straightforward to find the best scoring operating point in the valid range. For the case of real application data without transcriptions, the threshold update slider can be used to modulate in what direction and how much to modify the initial threshold found using the criteria of a constant number of accepted/rejected utterances as described above. However, it should be kept in mind that in the case where no transcriptions are available, only a centered slider guarantees the double gain constraint. So it is important for the user to supervise the correct desired behavior of the system after system updating, and if performance loss is detected in either CA or FA, the system can be backed-off to the more conservative approach of centering the slider. This concern does not affect the case with transcriptions where the search space is reduced to the region that satisfies the double gain constraint.

Instead of updating the confidence score thresholds as described above, the confidence scores themselves can be automatically mapped from the old system to the new system to modify the new confidence score distribution to fit the old confidence score thresholds. Given labeled training data, confidence scores of a system can be mapped to posterior probabilities by using an algorithm such as the one described in B. Maison, R. Gopinath, *Robust Confidence Annotation And Rejection For Continuous Speech Recognition*, IEEE International Conference on Acoustics, Speech, and Signal Processing 2001, Salt Lake City, Utah., May 7-May 11, 2001, pp. 389-392; incorporated herein by reference (NB: they use this algorithm to solve a different problem). The mapping can be estimated using representative labeled training data. Specifically, one can estimate two separate mapping functions that map the confidence scores for the old system and the new system to posterior probabilities, respectively. There is then an equivalence relationship between the two sets of confidence scores from which to create the desired mapping. Thus a pseudo code representation of such approach might be set forth as follows:

```
Process ConfidenceMapping
  perform Mapping(System1)
        ; Mapping A of old confidence scores to posterior
        ; probabilities
  perform Mapping(System2)
        ; Mapping B of new confidence scores to posterior
        ; probabilities
  perform Equiv_Mapping(System1, System2)
        ; mapping confidence System1 to System2 by relationship
        ; mapped_conf = A-1(B(conf_2))
        ; where conf_2 is a confidence value from System2
```

The foregoing assumes discrete integer confidence values from 0-1000. If the above approach does not yield a complete mapping for all of these values, then any missing values can be filled in by linear interpolation.

Figure 6:
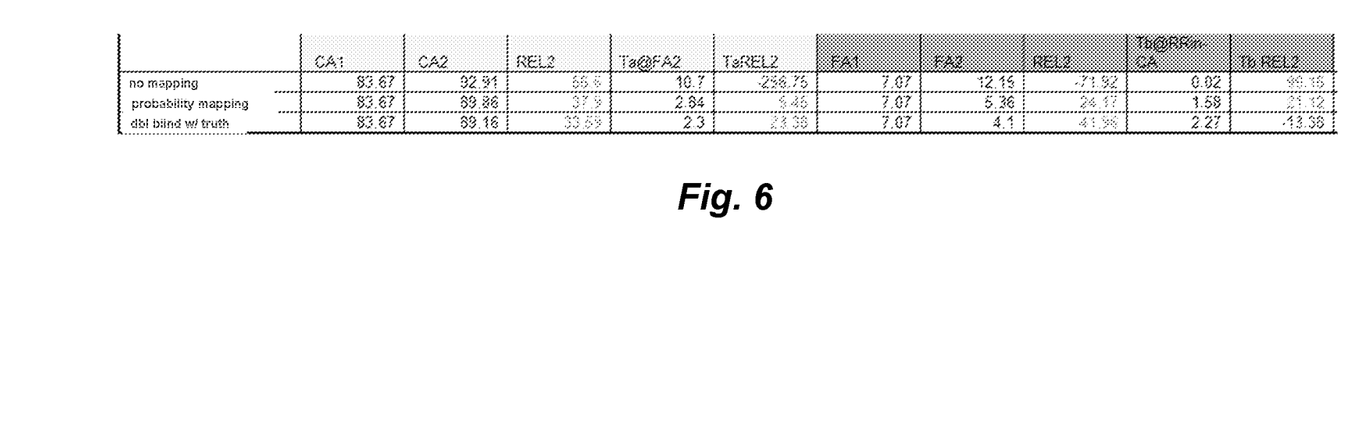
FIG. 6 shows a table of experimental data obtained during various recognition experiments testing systems specifically embodying the present invention.

One set of experiments was performed on a development set of data having 54,915 utterances using 40 tests having in total 67,698 utterances with results as shown in the table in FIG. 6. For each test, two confidence score thresholds were determined for the original system before updating ("System 1") at the following operating points: a. an FA of 3% and b. RRin (max CA)–CA of 2%. These thresholds were then used in the revised system after updating ("System 2"). For threshold a, CA should be maximized without letting FA go over 3%, and for threshold b, FA should be minimized without letting RRin–CA be greater than 2%. Row 1 of the data in FIG. 6 shows results for not doing any threshold mapping, Row 2 shows data using a probability mapping algorithm, and Row 3 shows data using a double blind constraint where real application data with transcription labels ("with truth") and trying to find a balanced result.

FIG. 6 shows data results averaged over the 40 tests. The first five columns on the left show the performance for threshold a, including the CA values, the relative improvement (REL2), where the System 2 operating point is at after updating the system (Ta@FA2), and its relative improvement (TaREL2). Similarly, for threshold b, (the five columns on the right) the FA values and the operating points are shown. For all the data values, the light numbers are "good" and the dark numbers are "bad". The data in row 1 shows doing no mapping creates operating points that are way off. Using probability mapping (Row 2) satisfies the operating points and gives good performance at them, while the double blind constraint algorithm (Row 3) also works well with the exception of the operating point at threshold b, which is a little higher than 2%.

Embodiments of the invention may be implemented in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method comprising:
   determining an original receiver operating characteristic (ROC) curve describing performance of a speech recognition system with respect to an original rate of false acceptance (FA) of the speech recognition system versus an original rate of correct acceptance (CA) of the speech recognition system;
   changing an algorithm used by the speech recognition system for sentence confidence scores, wherein changing the algorithm results in a new ROC curve with respect to a new rate of FA of the speech recognition system versus a new rate of CA of the speech recognition system;
   receiving a user specification of relative importance of the new rate of FA versus the new rate of CA; and
   based on the relative importance of the new rate of FA versus the new rate of CA, adjusting a confidence scoring functionality related to recognition reliability for a given input utterance,
   wherein at or above a given operating point of the speech recognition system, the new ROC curve reflects a double gain constraint relative to the original ROC curve, such that the new rate of FA is equal to or less than the original rate of FA, and the new rate of CA is equal to or greater than the original rate of CA.

2. The method of claim 1, wherein below the given operating point of the speech recognition system, the new ROC curve minimizes worsening of the rate of FA and the rate of CA.

3. The method of claim 1, comprising:
   one or more original settings of the confidence scoring functionality to corresponding one or more new settings of the confidence scoring functionality.

4. The method of claim 3, comprising:
   estimating the mapping using representative labeled training data.

5. The method of claim 4, wherein estimating the mapping using representative labeled training data comprises estimating a first mapping function that maps confidence scores for the original ROC curve to first posterior probabilities, and estimating a second mapping function that maps confidence scores for the new ROC curve to second posterior probabilities.

6. The method of claim 5, comprising:
   determining an equivalence relationship between the first mapping function and the second mapping function,
   wherein adjusting the confidence scoring functionality comprises adjusting the confidence scoring functionality based on the equivalence relationship between the first mapping function and the second mapping function.

7. The method of claim 6, comprising:
   determining a range of discrete integer confidence values for the equivalence relationship; and
   performing linear interpolation to determine any missing values in the range of discrete integer confidence values for the equivalence relationship.

8. The method of claim 1, wherein the confidence scoring functionality includes confidence score thresholds that define for a given set of circumstances whether to accept, reject, or confirm a given input utterance.

9. The method of claim 8, wherein adjusting the confidence scoring functionality includes updating the confidence score thresholds.

10. The method of claim 9, wherein the user specification of relative importance of the new rate of FA versus the new rate of CA comprises input establishing a priority favoring the rate of FA or the rate of CA.

11. The method of claim 9, wherein the confidence score thresholds on the new ROC curve are determined based on accepting and rejecting an equal percentage of input utterances as the confidence score thresholds on the original ROC curve.

12. The method of claim 1, wherein receiving the user specification of relative importance of the new rate of FA versus the new rate of CA comprises receiving the user specification of relative importance via an adjustable slider of a graphical user interface of the speech recognition system, wherein a position of the adjustable slider corresponds to the relative importance of the new rate of FA versus the new rate of CA.

13. The method of claim 1,
wherein the relative importance of the new rate of CA is greater than the relative importance of the new rate of FA, and
wherein based on the relative importance of the new rate of CA being greater than the relative importance of the new rate of FA, adjusting the confidence scoring functionality related to the recognition reliability for the given input utterance comprises maximizing the new rate of CA.

14. The method of claim 1,
wherein the relative importance of the new rate of FA is greater than the relative importance of the new rate of CA, and
wherein based on the relative importance of the new rate of FA being greater than the relative importance of the new rate of CA, adjusting the confidence scoring functionality related to the recognition reliability for the given input utterance comprises minimizing the new rate of FA.

15. The method of claim 1, wherein a search space used by the speech recognition system for the given input utterance is reduced to a region that satisfies the double gain constraint.

16. The method of claim 1, comprising:
updating an acoustic model used by the speech recognition system, wherein the updated acoustic model is associated with the new ROC curve with respect to the new rate of FA of the speech recognition system versus the new rate of CA of the speech recognition system.

17. Non-transitory computer-readable media storing executable instructions that, when executed by one or more processors, cause a speech recognition system to:
determine an original receiver operating characteristic (ROC) curve describing performance of the speech recognition system with respect to an original rate of false acceptance (FA) of the speech recognition system versus an original rate of correct acceptance (CA) of the speech recognition system;
change an algorithm used by the speech recognition system for sentence confidence scores, wherein changing the algorithm results in a new ROC curve with respect to a new rate of FA of the speech recognition system versus a new rate of CA of the speech recognition system;
receive a user specification of relative importance of the new rate of FA versus the new rate of CA; and
based on the relative importance of the new rate of FA versus the new rate of CA, adjust a confidence scoring functionality related to recognition reliability for a given input utterance,
wherein at or above a given operating point of the speech recognition system, the new ROC curve reflects a double gain constraint relative to the original ROC curve, such that the new rate of FA is equal to or less than the original rate of FA, and the new rate of CA is equal to or greater than the original rate of CA.

18. The non-transitory computer-readable media of claim 17, wherein below the given operating point of the speech recognition system, the new ROC curve minimizes worsening of the rate of FA and the rate of CA.

19. The non-transitory computer-readable media of claim 17, wherein the executable instructions, when executed by the one or more processors, cause the speech recognition system to:
map one or more original settings of the confidence scoring functionality to corresponding one or more new settings of the confidence scoring functionality.

20. The non-transitory computer-readable media of claim 17, wherein the confidence scoring functionality includes confidence score thresholds that define for a given set of circumstances whether to accept, reject, or confirm a given input utterance.

21. The non-transitory computer-readable media of claim 20, wherein adjusting the confidence scoring functionality includes updating the confidence score thresholds.

22. The non-transitory computer-readable media of claim 21, wherein the user specification of relative importance of the new rate of FA versus the new rate of CA comprises input establishing a priority favoring the rate of FA or the rate of CA.

23. The non-transitory computer-readable media of claim 21, wherein the confidence score thresholds on the new ROC curve are determined based on accepting and rejecting an equal percentage of input utterances as the confidence score thresholds on the original ROC curve.

24. A system comprising:
one or more processors; and
non-transitory memory storing executable instructions that, when executed by the one or more processors, cause the system to:
determine an original receiver operating characteristic (ROC) curve describing performance of the system with respect to an original rate of false acceptance (FA) of the system versus an original rate of correct acceptance (CA) of the system;
change an algorithm used by the system for sentence confidence scores, wherein changing the algorithm results in a new ROC curve with respect to a new rate of FA of the system versus a new rate of CA of the system;
receive a user specification of relative importance of the new rate of FA versus the new rate of CA; and
based on the relative importance of the new rate of FA versus the new rate of CA, adjust a confidence scoring functionality related to recognition reliability for a given input utterance,
wherein at or above a given operating point of the system, the new ROC curve reflects a double gain constraint relative to the original ROC curve, such that the new rate of FA is equal to or less than the original rate of FA, and the new rate of CA is equal to or greater than the original rate of CA.

25. The system of claim 24, wherein below the given operating point of the system, the new ROC curve minimizes worsening of the rate of FA and the rate of CA.

26. The system of claim 24, wherein the executable instructions, when executed by the one or more processors, cause the system to:
   map one or more original settings of the confidence scoring functionality to corresponding one or more new settings of the confidence scoring functionality.

27. The system of claim 24, wherein the confidence scoring functionality includes confidence score thresholds that define, for a given set of circumstances, whether to accept, reject, or confirm a given input utterance.

28. The system of claim 27, wherein adjusting the confidence scoring functionality includes updating the confidence score thresholds.

29. The system of claim 28, wherein the user specification of relative importance of the new rate of FA versus the new rate of CA comprises input establishing a priority favoring the rate of FA or the rate of CA.

30. The system of claim 28, wherein the confidence score thresholds on the new ROC curve are determined based on accepting and rejecting an equal percentage of input utterances as the confidence score thresholds on the original ROC curve.

* * * * *